United States Patent
Lee et al.

(10) Patent No.: US 7,041,948 B2
(45) Date of Patent: May 9, 2006

(54) MICROWAVE OVEN WITH A TOASTER AND METHOD FOR CONTROLLING A HEATER OF THE TOASTER

(75) Inventors: Jae Hyun Lee, Seoul (KR); Gil Ju Jung, Seoul (KR); Yun Ho Cho, Seoul (KR)

(73) Assignee: Daewoo Electronics Corporation, (KR)

( * ) Notice: Subject to any disclaimer, the term of this patent is extended or adjusted under 35 U.S.C. 154(b) by 0 days.

(21) Appl. No.: 10/867,759

(22) Filed: Jun. 16, 2004

(65) Prior Publication Data

US 2004/0262299 A1 Dec. 30, 2004

(30) Foreign Application Priority Data

| Jun. 30, 2003 | (KR) | ................. 10-2003-0043448 |
| Jun. 30, 2003 | (KR) | ................. 20-2003-0020719 |
| Jun. 30, 2003 | (KR) | ................. 20-2003-0020723 |
| Jun. 30, 2003 | (KR) | ................. 20-2003-0020724 |
| May 14, 2004 | (KR) | ................. 10-2004-0034086 |

(51) Int. Cl.
*H05B 6/80* (2006.01)
*A47J 37/00* (2006.01)

(52) U.S. Cl. .............. 219/680; 219/685; 219/756; 219/762; 99/385; 99/451

(58) Field of Classification Search .......... 219/685, 219/680, 725, 739, 756, 762, 763, 386, 413, 219/521; 99/385, 399, 400, 402, 391–393, 99/451, DIG. 14
See application file for complete search history.

(56) References Cited

U.S. PATENT DOCUMENTS

| 3,625,714 A * | 12/1971 | Hitzeroth et al. ............. 99/389 |
| 3,870,863 A | 3/1975 | Ohnmacht |
| 2003/0042252 A1* | 3/2003 | Back et al. ................. 219/679 |
| 2004/0050841 A1* | 3/2004 | Han et al. ................... 219/685 |

FOREIGN PATENT DOCUMENTS

| EP | 1213948 | 6/2002 |
| GB | 956791 | 4/1964 |
| JP | 2-4131 | * 1/1990 ............. 219/685 |
| KR | 10-2002-0089969 | 11/2002 |
| KR | 10-2004-0021255 | 3/2004 |

* cited by examiner

*Primary Examiner*—Philip H. Leung
(74) *Attorney, Agent, or Firm*—Bacon & Thomas PLLC

(57) ABSTRACT

A microwave oven with a toaster includes a toaster casing, a heating chamber inserted in the toaster casing, a bread receiver slidably inserted in the toaster casing, and a toaster door attached to a front side of the bread receiver. The bread receiver is selectively placed in the heating chamber. The microwave oven further includes a crumb tray slidably inserted in the toaster casing for collecting crumbs of bread and a holding unit for holding bread put in the bread receiver. The crumb tray is placed under the bread receiver. Further, there is provided a process for controlling a heater of the toaster, which is capable of properly baking bread even when the toaster is continually operated.

11 Claims, 12 Drawing Sheets

MICROWAVE OVEN WITH A TOASTER AND METHOD FOR CONTROLLING A HEATER OF THE TOASTER

FIELD OF THE INVENTION

The present invention relates to a microwave oven with a toaster; and, more particularly, to a microwave oven with a toaster having an improved structure and a method for controlling a heater of the toaster.

BACKGROUND OF THE INVENTION

In general, a microwave oven with a toaster is an appliance capable of toasting food (e.g., bread products) as well as performing inherent functions of the microwave oven by using microwaves.

Referring to FIG. 1, there is illustrated a conventional microwave oven with a toaster as disclosed in U.S. Pat. No. 6,539,840. At a side portion of the microwave oven, there is provided an electric device chamber 300 in which a magnetron 210 for generating microwaves, a high-voltage transformer 212 for supplying high voltage to the magnetron 210, and a fan 314 for generating an air flow to cool the electric devices are installed. A toaster unit 200 for toasting bread is disposed in front of the electric device chamber 300. The toaster unit 200 is closed and opened by a toaster door 230. As shown in FIG. 1, the toaster door 230 is positioned under a control panel 214 at which a plurality of control buttons are provided. The toaster unit 200 includes a casing 202 with a predetermined cavity and the toaster door 230 is pivoted about a hinge shaft Ha to close and open the casing 202. A heater for heating bread is provided in the casing 202. A pair of cooperating levers 222 are at one ends thereof connected to middle portion of both sides of the toaster door 130 and at the other ends to both side of a tray 220 movably placed in the casing 202. The cooperating levers 222 are pivotally connected to both of the toaster door 230 and the tray 220. Accordingly, when the toaster door 230 is opened and closed, the tray 220 and hence bread B put therein are also moved forward and backward.

In such conventional arrangements, however, since the toaster door 230 is pivoted about the hinge shaft Ha and connected through the cooperating levers 222 to the tray 220, many components are required and the assembling process thereof is complicated, thereby decreasing the productivity of the microwave oven. Moreover, in the operation of the toaster of the conventional microwave oven, in case that the toaster is continually operated, the heater is overheated so that bread is over-baked or burnt black. In order to prevent the above problem, a user may set an operation time of the heater at every operations based on his experience; however, this is very cumbersome work.

SUMMARY OF THE INVENTION

It is, therefore, an object of the present invention to provide a microwave oven with a toaster having a simpler and improved structure.

It is another object of the present invention to provide a microwave oven with a toaster capable of collecting crumbs of bread.

It is still another object of the present invention to provide a microwave oven with a toaster capable of preventing a movement of bread put in a bread receiver to reduce crumbs of the bread.

It is still further another object of the present invention to provide a microwave oven with a toaster capable of simply and positively securing a heater plate to a side wall of a heating chamber.

It is still further another object of the present invention to provide a microwave oven with a toaster capable of suppressing heat transfer from the heater plate to the heating chamber.

In accordance with an aspect of the present invention, there is provided a microwave oven with a toaster comprising: a toaster casing; a heating chamber inserted in the toaster casing; a bread receiver slidably inserted in the toaster casing, the bread receiver being selectively placed in the heating chamber; and a toaster door attached to a front side of the bread receiver.

In accordance with another aspect of the present invention, there is provided a method for controlling a heater of a toaster incorporated in a microwave oven, the method comprising the steps of: (a) actuating the heater for a heater ON time; and (b) determining whether or not the toaster is continually operated, and if yes, the heater ON time is gradually decreased as the continual toaster operation number is increased. In accordance with still another aspect of the present invention, there is provided a method for controlling a heater of a toaster incorporated in a microwave oven, the method comprising the steps of: (a) setting a heater ON time and a heater OFF time; (b) actuating the heater for the heater ON time after the heater OFF time has elapsed; (c) determining whether or not the toaster is continually operated, and if yes, resetting the heater OFF time by adding a predetermined time thereto and the heater ON time by subtracting a predetermined time therefrom; and (d) repeating the steps (b) and (c).

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 2:
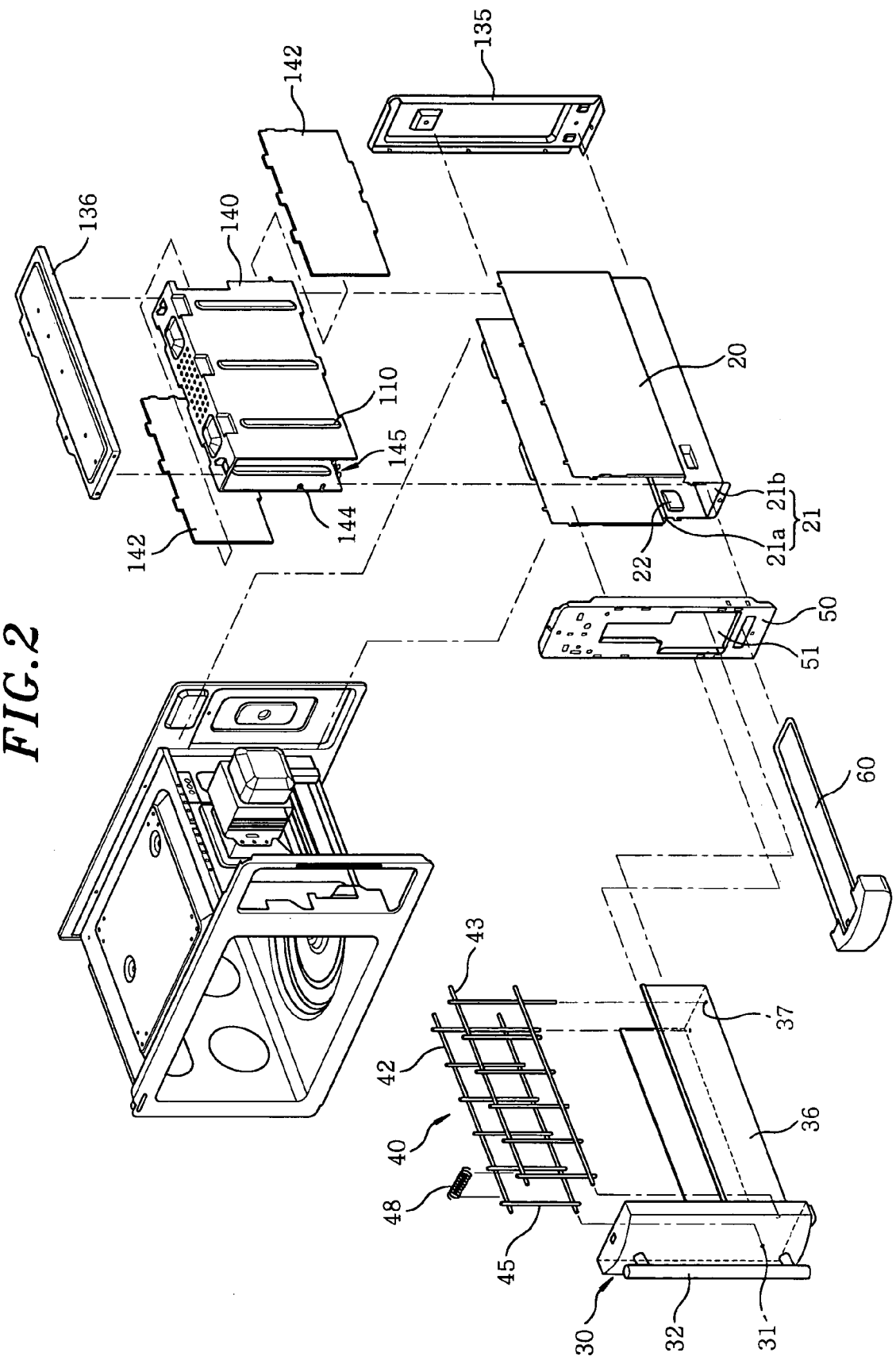
FIG. 2 describes an exploded view of a microwave oven with a toaster in accordance with the present invention.
Figure 3:
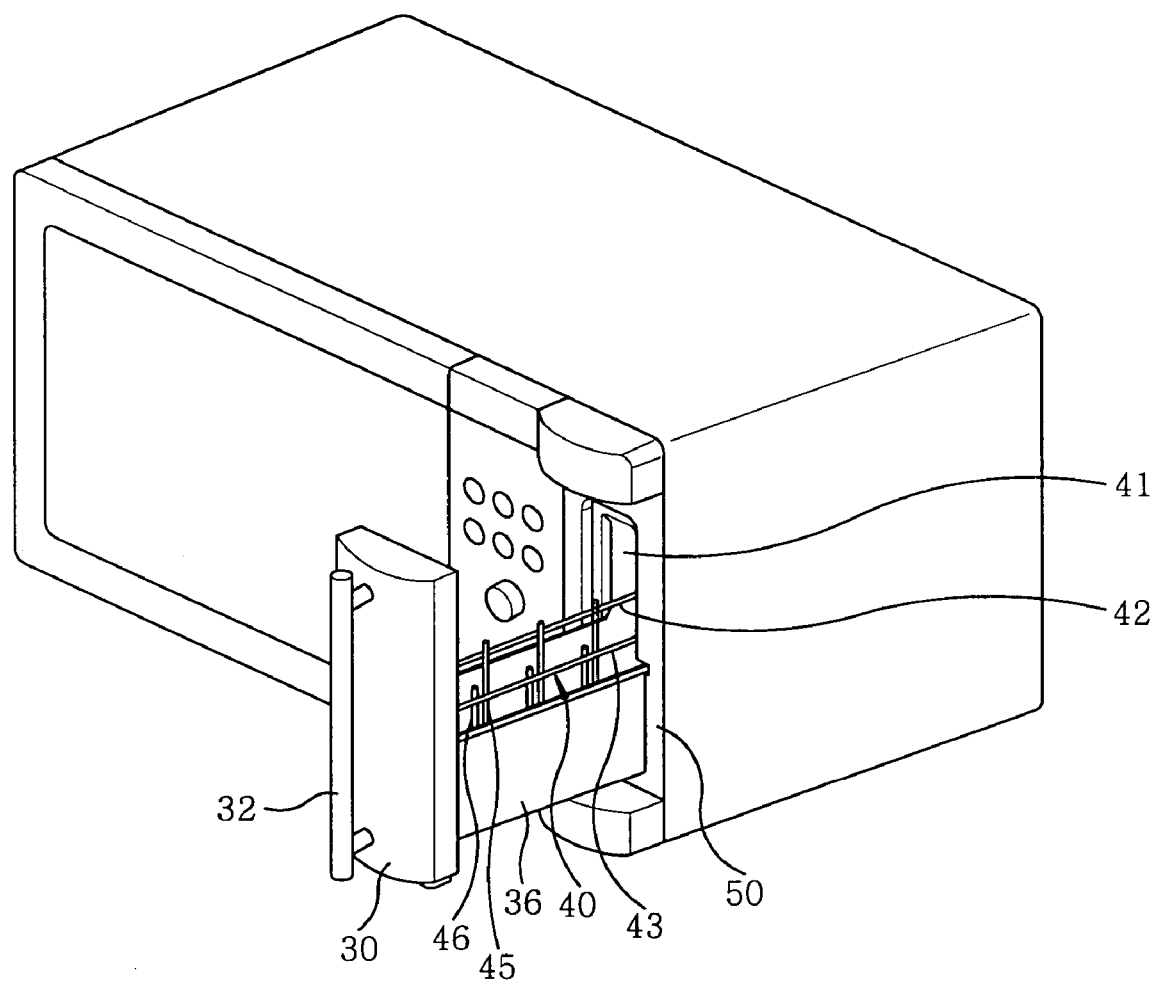
FIG. 3 represents a perspective view of the microwave oven shown in FIG. 2.
Figure 4A:
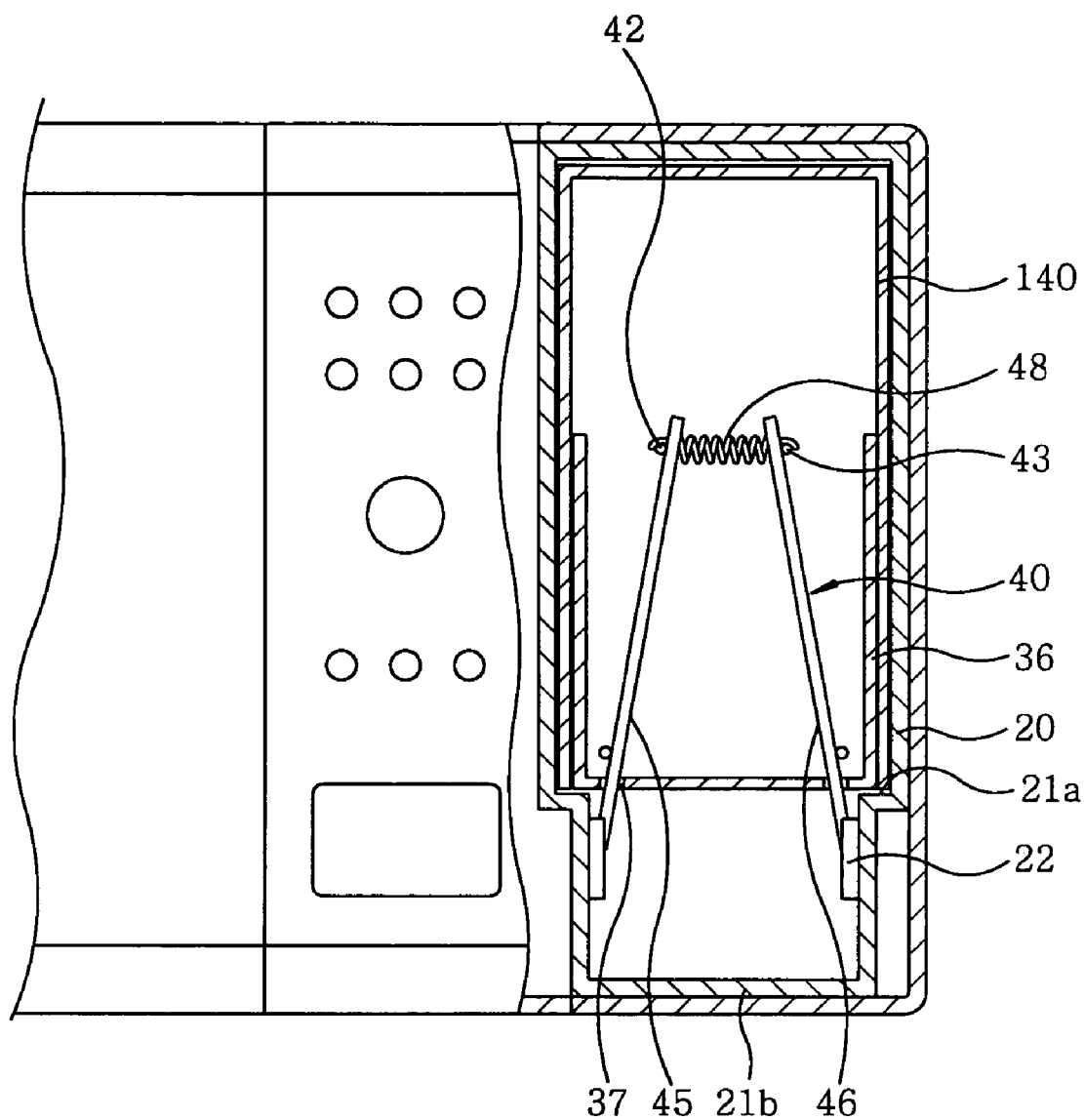
FIGS. 4A to 4C are partial cross sectional views showing a stepped section and a holding unit for holding bread put in a bread receiver of the toaster in FIG. 2.
Figure 4B:
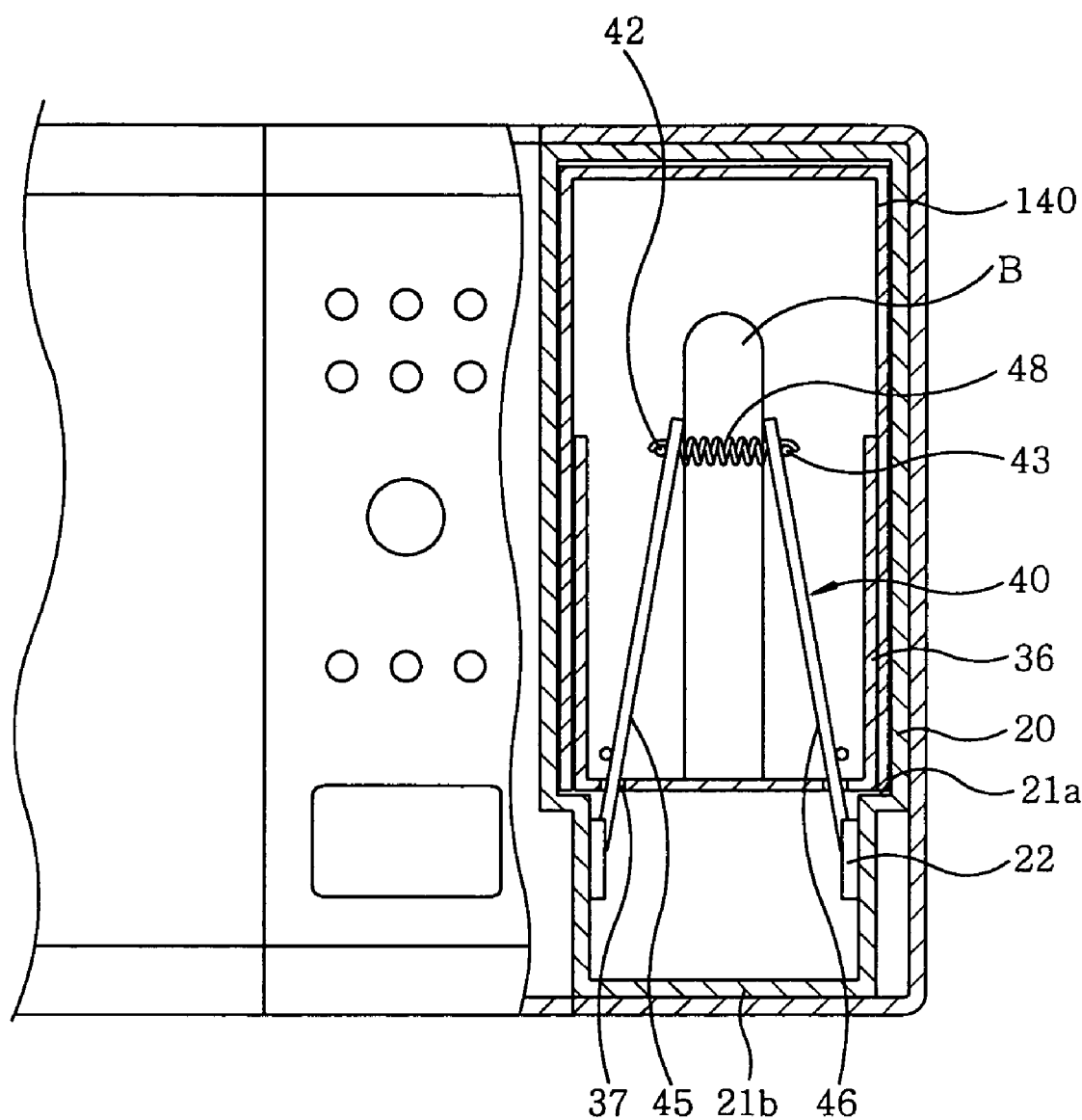
Figure 4C:
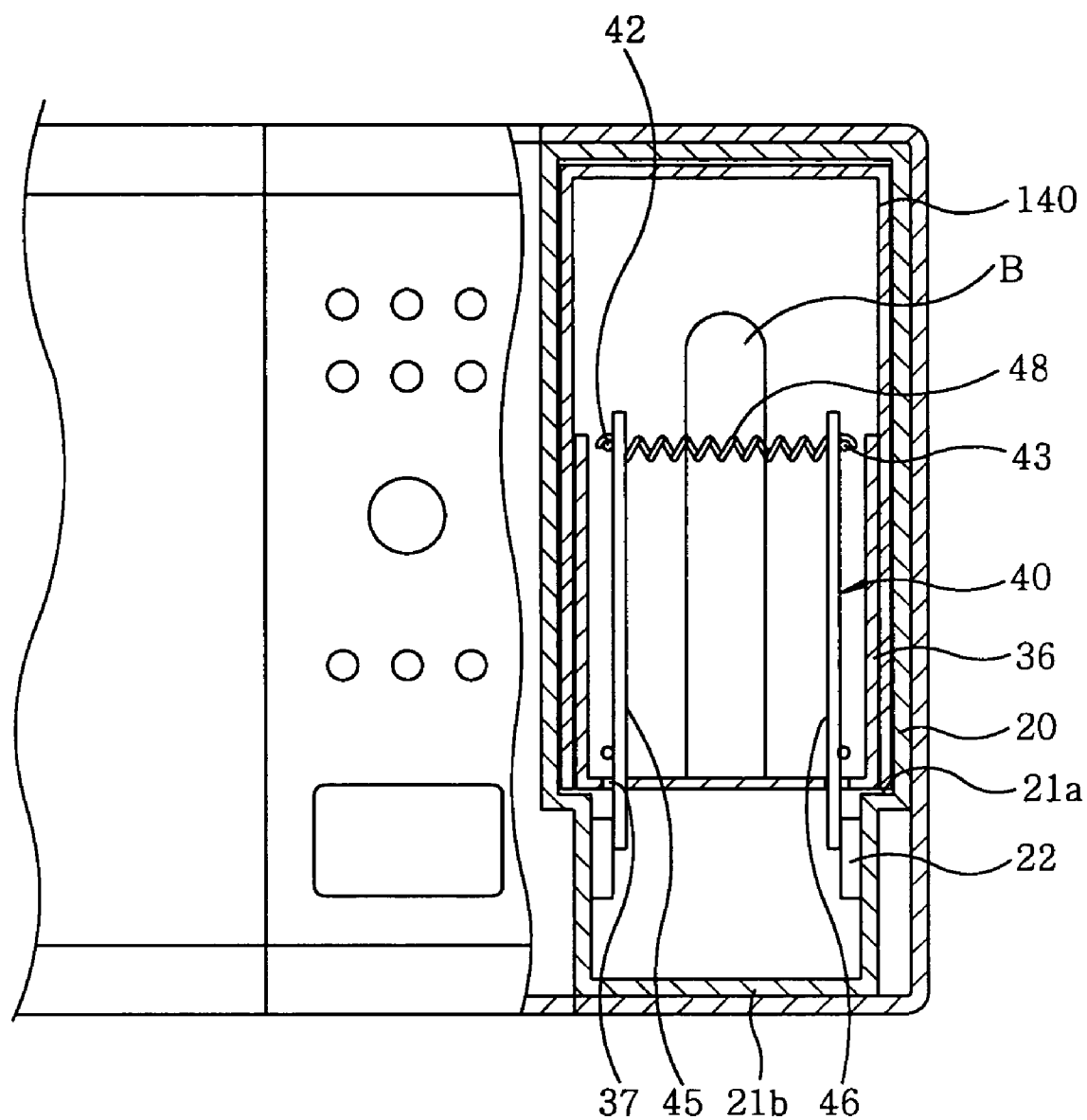

Referring to FIG. 2, there is shown an exploded view of a microwave oven with a toaster in accordance with the present invention. The toaster is provided at a side portion of the microwave oven. The toaster includes a toaster casing 20 with an approximate U-shape in section; a heating chamber 140 with an approximate reverse U-shape in section, the heating chamber 140 being inserted in the toaster casing 20; a bread receiver 36 slidably inserted in the toaster casing 20, the bread receiver 36 being selectively placed in the heating chamber 140; a toaster door 30 attached to a front side of the bread receiver 36; and crumb tray 60 for collecting crumbs of bread.

Disposed at a front side of the toaster casing 20 is a casing cover 50 with a first opening 51 for the bread receiver 36 and a second opening 52 for the crumb tray 60. Further, a rear cover 56 and an upper cover 136 are attached to a rear and an upper side of the toaster casing 20, respectively. The bread receiver 36 and the crumb tray 60 are inserted through the first and the second opening 51, 52 into the heating chamber 140, respectively.

Figure 5A:
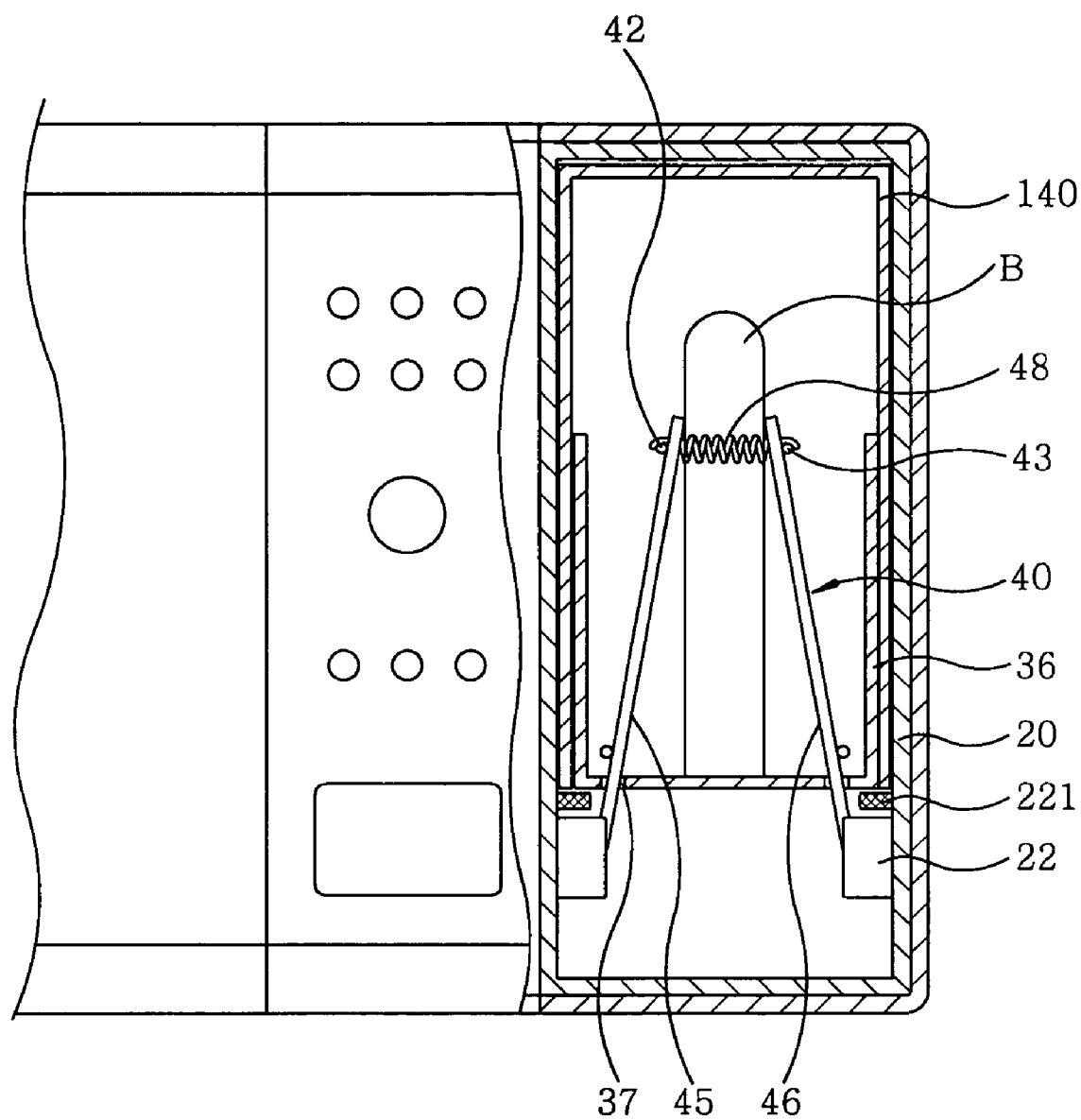
FIGS. 5A and 5B are partial cross sectional views showing a modified embodiment wherein a pair of guide rails are employed instead of the stepped section.
Figure 5B:
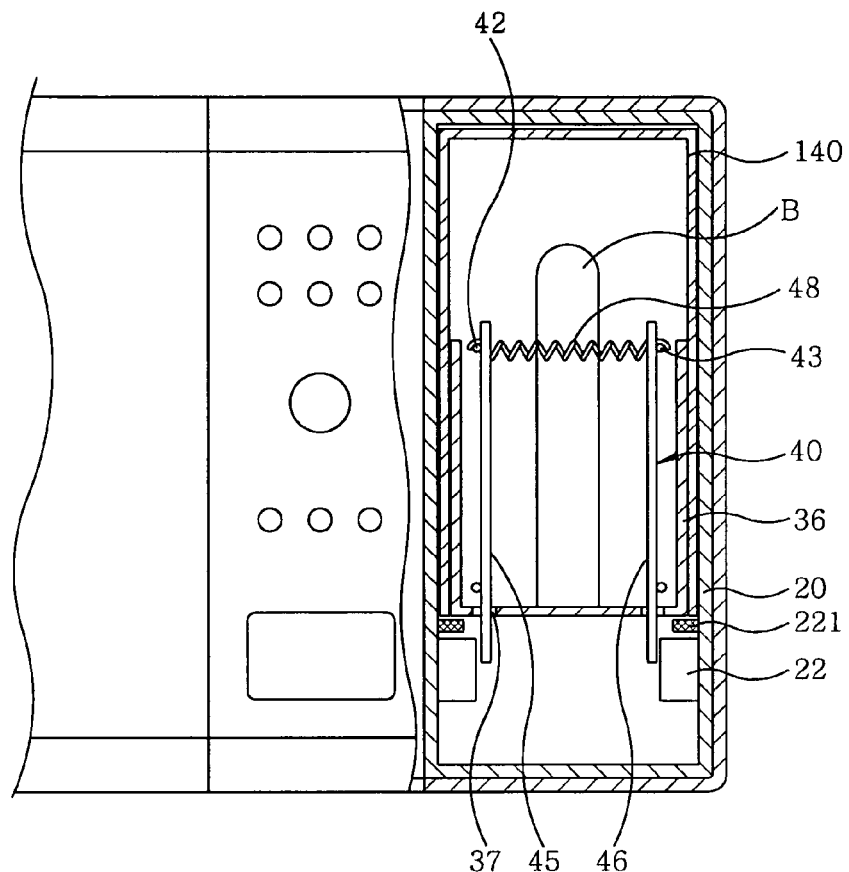

Referring now to FIGS. 2 and 4A to 4C, a stepped section 21 is formed at a bottom of the toaster casing 20. The bread receiver 36 is placed on an upper portion 21a of the stepped section 21 and slid thereon when a user pushes or pulls the toaster door 30. The crumb tray 60 is placed and slid on a lower portion 21b of the stepped section 21 and collects crumbs which may occur during the baking operation and/or the movement or the bread. Alternatively, as shown in FIGS. 5A and 5B, a pair of opposite guide rails 221 may protrude inwardly from both side walls of the toaster casing 20 and run in a sliding direction of the bread receiver 36. In this case, the bread receiver 36 may be slidably placed on the guide rails 221 and the crumb tray 60 may be slidably placed on the bottom of the toaster casing 20 under the bread receiver 36.

Figure 8A:
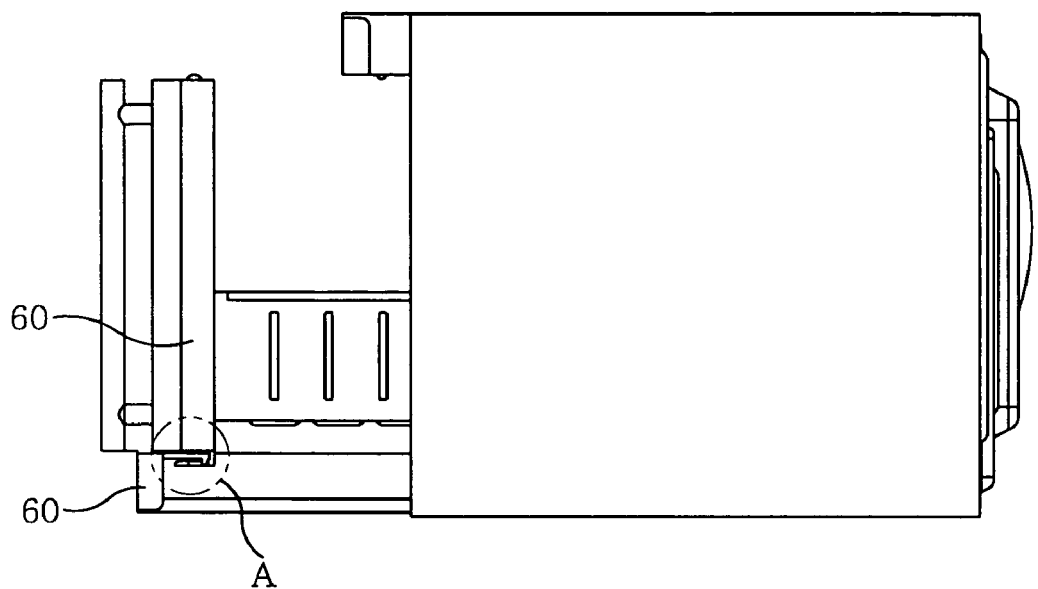
FIG. 8A is a side view of the microwave oven of the present invention.
Figure 8B:
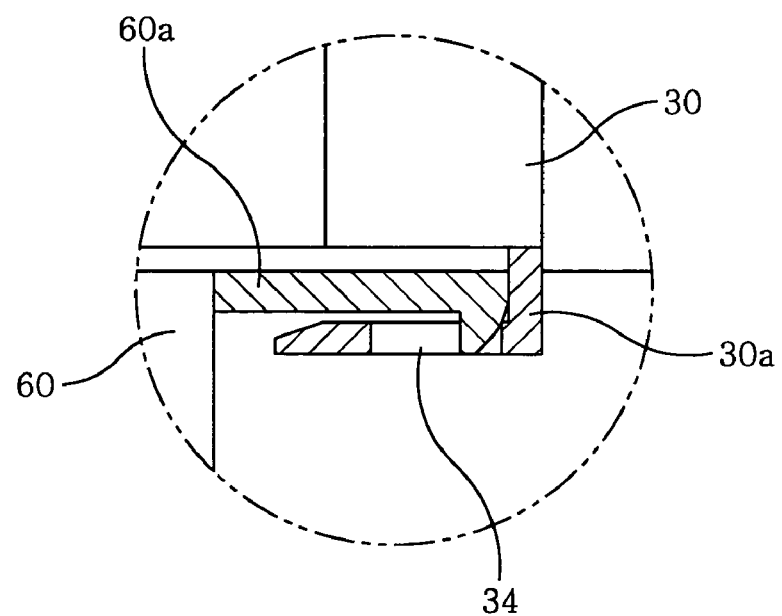
FIG. 8B is an enlarged view of a circled part A in FIG. 8A showing a connection between a toaster door and a crumb tray.

Further, as shown in FIGS. 8A and 8B, the crumb tray 60 has a hook 60a and the toaster door 30 has at its lower portion a hook receptacle 30a. By connecting the hook 60a with the hook receptacle 30a, the crumb tray 60 can be interlocked with the toaster door 30 and moved therewith. Specifically, the hook 60a extends from an upper portion of the crumb tray 60 in a longitudinal direction thereof and the hook receptacle 30a extends from a lower portion of the toaster door 30 in an approximate L-shape. The hook 60a is engaged with the hook receptacle 30a so that, when the toaster door 30 is moved, the crumb tray 60 is moved therewith. In case the user wants to remove crumbs collected in the crumb tray 60, the user can separate the crumb tray 60 from the toaster door 30 by releasing the hook 60a from the hook receptacle 30a.

Installed in the bread receiver 36 is a holding unit 40 for holding bread put in the bread receiver 36. The holding unit 40 includes a pair of holding members 42. The holding member 40 has a plurality of (e.g., two) horizontal-extending rods 43 which are vertically spaced apart from each other and a plurality of (e.g., six) vertical-extending rods 45 which are horizontally spaced from each other to connect the horizontal-extending rods 43 together. The lowermost rod 43 of the holding member 40 is inserted into a corresponding recess 31 formed in the toaster door 30 and the innermost vertical-extending rod 45 is extended below the bread receiver 36 through a corresponding hole 37 formed in a bottom of the bread receiver 36. Both ends of an elastic member 48, e.g., a coiled spring, are respectively connected to, e.g., two uppermost horizontal-extending rods 43 to pull them toward each other so that a distance between the uppermost horizontal-extending rods 43 becomes narrower.

When the user pulls the toaster door 30 to draw out the bread receiver 36 from the toaster casing 30, the bread receiver 36 is slid on the upper portion 21a of the stepped section 21. At that time, the lower end portions of the innermost vertical-extending rods 45 extending through the holes 37 are also moved along the vertical walls of the stepped section 21 and come to contact with protrusions 22 formed on the vertical walls, respectively. When the user further pulls the toaster door 30, the lower end portions of the innermost vertical-extending rods 45 are moved along the respective protrusions 22 and pushed toward the longitudinal center line of the bread receiver against the force of the spring 48 so that the distance between the uppermost horizontal-extending rods 43 becomes wider. Under this condition, the user can easily take out baked bread and/or put new bread into the bread receiver 36. Preferably, the contact surface of each of the protrusions 22 is gradually protruded from the vertical side wall of the stepped section 21, to thereby facilitate the movement of the lower end portions of the innermost vertical-extending rods 45.

In order to bake bread, the user pushes the toaster door 30 to put the bread receiver 36 into the heating chamber 140. As the bread receiver 36 moves on and along the upper portion 21a of the stepped section 21, the innermost vertical-extending rods 45 are released from the protrusions 22 and the distance between the uppermost horizontal-extending rods 43 becomes narrow again by the force of the spring 48 to hold the bread in place. As a result, during the movement of the bread receiver 36, the bread put therein is prevented from being moved, thereby decreasing crumbs which may occur during the movement of the bread receiver 36.

Figure 7:
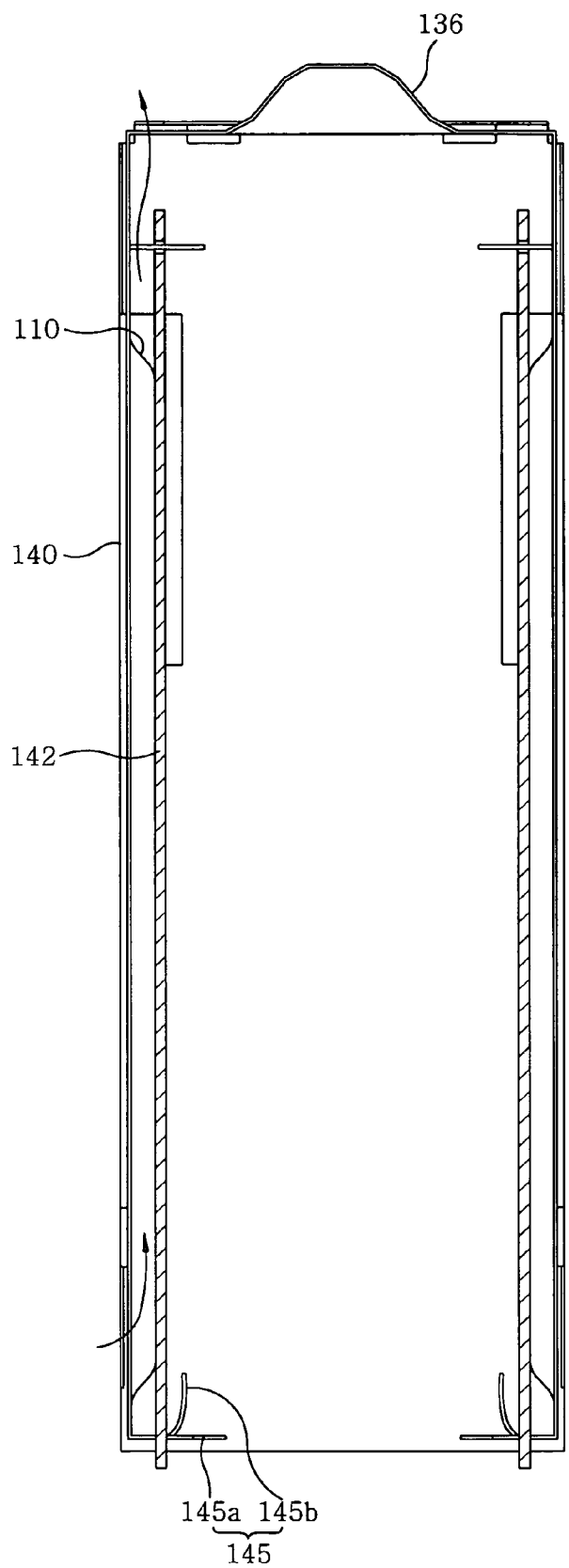
FIG. 7 depicts a cross sectional view of an assembly of the heating chamber and the heater plate shown in FIG. 2.

In addition, referring to FIGS. 2, 7 and 8, a heater plate 112 having a heater (not shown) is installed on an inner surface of each side wall of the heating chamber 140. Fastening members 144 are provided at a front and a rear end of each side wall of the heating chamber 140, respectively, the fastening members 144 being inwardly protruded opposite to each other. The fastening members 144 are bent inwardly onto an inner surface of the heater plate 112 after the latter is placed on the inner surface of the side wall of the heating chamber 140, to thereby hold the front and the rear end portion of the heater plate 112. Further, supporting members 145 are provided at a lower end of each side wall of the heating chamber 140 near the front and the rear end thereof, respectively. The supporting members 145 are bent upwardly onto the inner surface of the heater plate 112 after the latter is placed on the inner surface of the side wall of the heating chamber 140, to thereby support the lower end portion of the heater plate 112.

Figure 6:
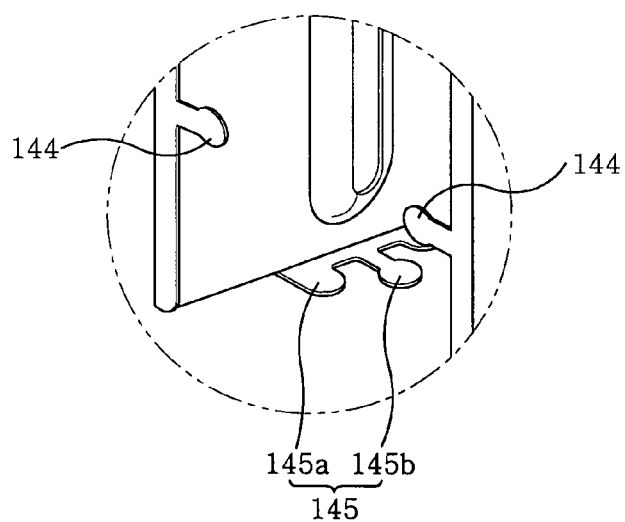
FIG. 6 sets forth an enlarged view showing fastening members and supporting members for positively securing a heater plate to side walls of the heating chamber.

As shown in FIG. 6, it is preferable that the supporting member 145 has a supporting portion 145a for supporting the lower end of the heater plate 112 and a bendable portion 145b which is bent onto the heater plate 112. Further, it is preferable that the fastening member 144 and the bendable portion 145b have a width-reduced part for easy bending thereof. The width of the width-reduced part is determined to have a sufficient strength to support the heater plate 112.

Figure 1:
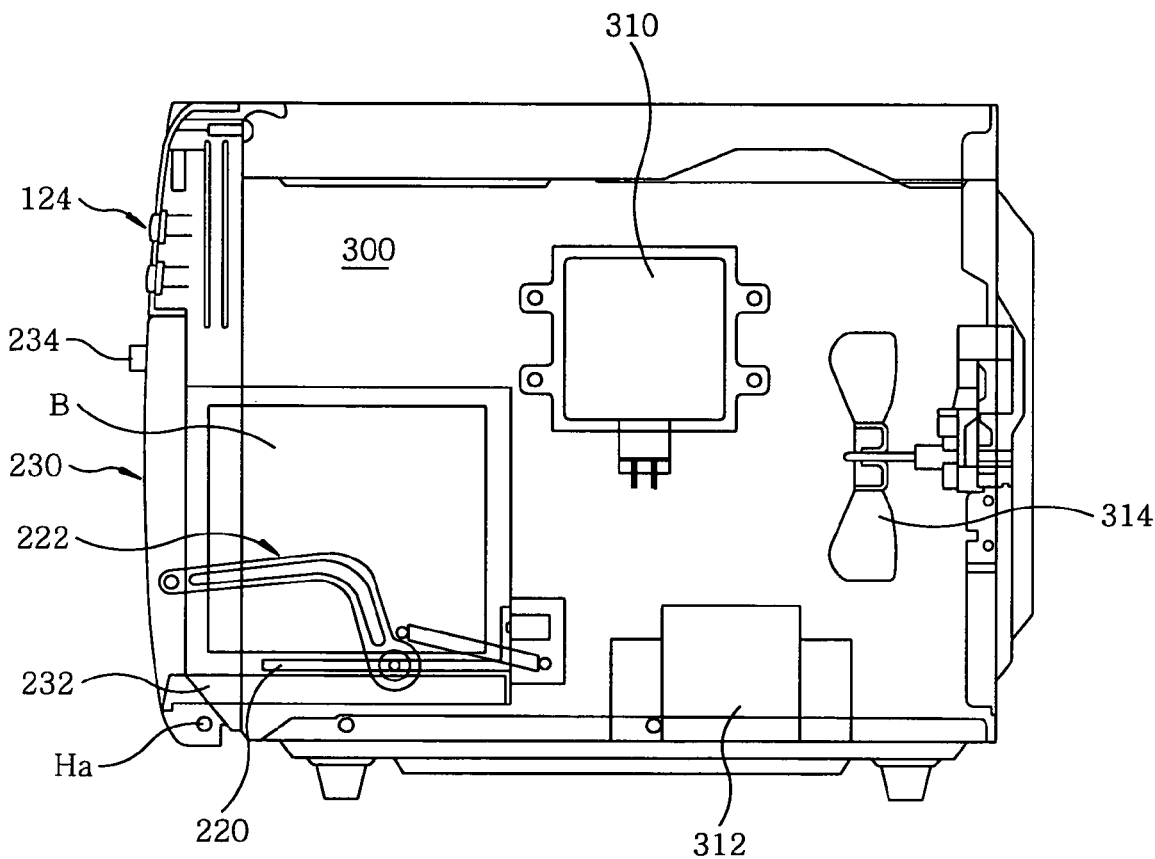
FIG. 1 shows a schematic side sectional view of a conventional microwave oven with a toaster.

Moreover, referring to FIGS. 2 and 7, provided on the side walls of the heating chamber 140 are a plurality of embossed portions 110 protruded inwardly. In this embodiment, the embossed portions 110 are vertically extended parallel to each other, but the present invention is not limited thereto. For example, the embossed portions 110 may be horizontally extended parallel to each other or may be located sporadically. By the embossed portions 110, there is provided space between the heating chamber 140 and the heater plate 112 installed on the side wall thereof so that the transfer of heat generated by the heater plate 112 to the heating chamber 140 is reduced compared with a case that the heater plate 112 is closely installed on the side wall of the heating chamber 140 without any space therebetween. Moreover, by operating a fan 314 disposed in an electric device chamber 300 (see FIG. 1), an air flow is generated between the heater plate 112 and the side wall of the heating chamber 140 so that the transfer of heat from the heater plate 112 to the heating chamber 140 can be further reduced.

Figure 9:
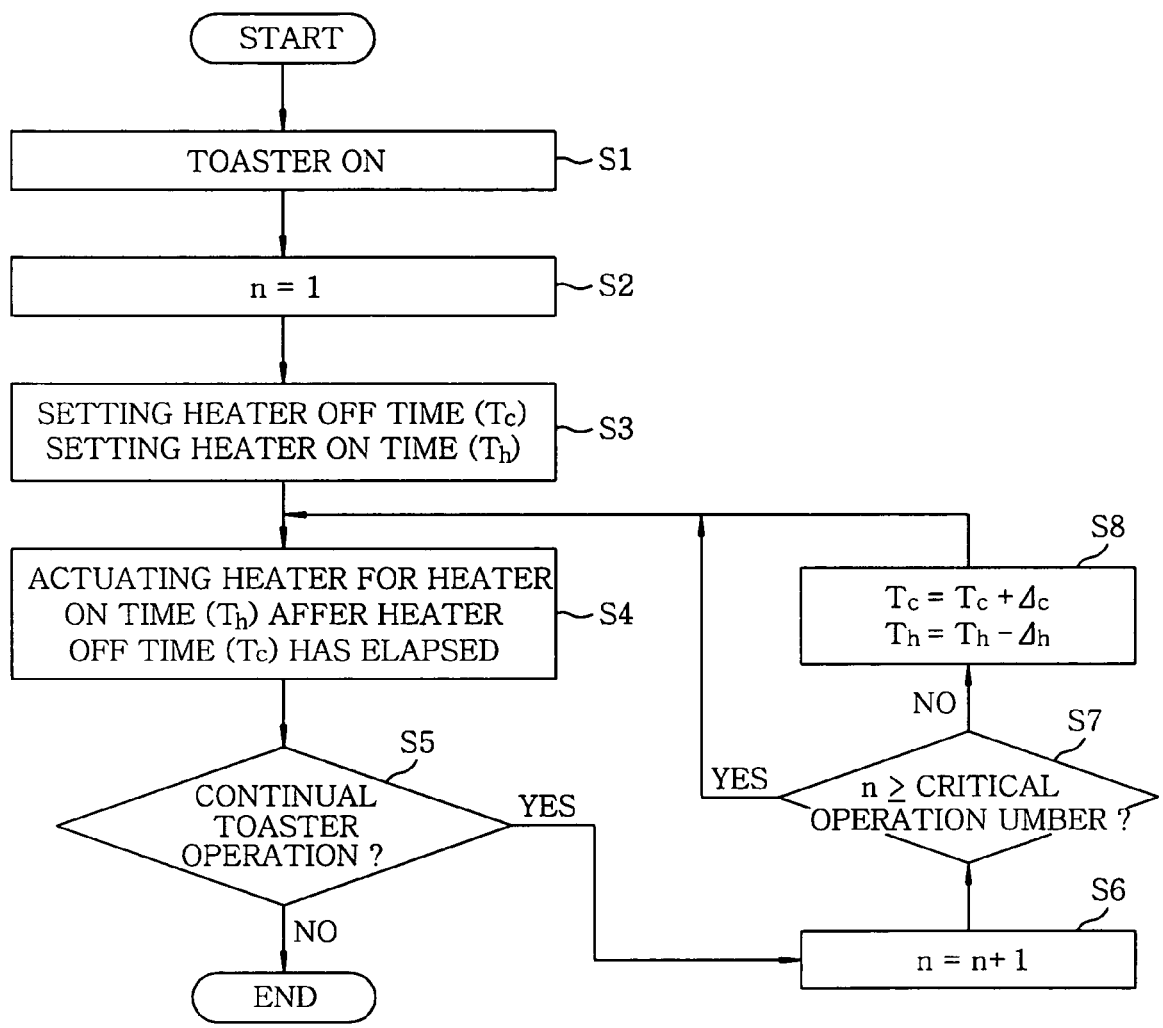
FIG. 9 is a flow chart of a process for controlling a heater of the toaster in accordance with the present invention.

Hereinafter, a process for controlling the heater of the toaster in accordance with the present invention will be described with reference with FIG. 9.

When a user pushes a toaster operation button (not shown) provided on a control panel (not shown) (S1), the toaster is operated. A controller (not shown) sets the operation number n to 1 (n=1) (S2) and a heater OFF time $T_c$, and a heater ON time $T_h$ to, e.g., 0 sec and 30 sec. respectively (S3). The controller actuates the heater for the heater ON time $T_h$ after the heater OFF time $T_c$, has elapsed (S4).

After the first toasting operation is completed, if the user pushes a continual operation button (not shown), the controller determines that this is a continual toaster operation (S5). Then, the controller sets the operation number n to n+1 and determines that this is the second operation (S6). At this time, the controller determines whether or not the operation number n is equal to or greater than a predetermined critical operation number (S7). If yes, the step S4 is again performed. In the step S7, if it is determined that the operation number is less than the predetermined critical operation number, the controller sets the heater OFF time $T_c$, to $T_c+\Delta c$ (for example, $\Delta c$ is 5 sec) and the heater ON time $T_h$ to $T_h-\Delta h$ (for example, $\Delta h$ is 3 sec) (S8). Then, the step S4 is performed based on the heater OFF time $T_c$ and the heater ON time $T_h$ reset in the step S8. For example, when the critical operation number is 5, in the second operation, the steps S8 and S4 are performed so that the heater is stopped for 5 sec and actuated for 27 sec after the heat OFF time (5 sec) has elapsed.

Thereafter, when the user pushes the continual operation button again, the controller determines that this is the third operation, and sets the heater OFF time $T_c$ to $T_c+\Delta c$ and the heater ON time $T_h$ to $T_h-\Delta h$ at the step S8. Then, the step S4 is performed based on the heater OFF time $T_c$ and the heater ON time $T_h$ reset in the step S8. That is, the heater is actuated for 24 sec after the heater OFF time (10 sec) has elapsed.

In this way, as the continual operation number of the toaster is increased, the heater OFF time $T_c$ is gradually increased and the heater ON time $T_h$ is gradually decreased.

However, after the operation number reaches the critical operation number, the heater OFF time $T_c$ and the heater ON time $T_h$ are kept unchanged. Specifically, after the fourth toaster operation wherein the heater is energized for 21 sec after the heater OFF time (15 sec) has elapsed, when the user pushes the continual operation button for the fifth operation, the controller determines that the operation number is equal to the predetermined critical operation number and controls the toaster to perform the step S4 without performing the step S8. Therefore, the heater OFF time $T_c$ and the heater ON time $T_h$ are kept unchanged. (At this time, the heater OFF time and the heater ON time are referred to as a critical heater OFF time and a critical heater ON time, respectively.)

After the fifth toaster operation, when the user pushes the continual operation button for the sixth operation, the controller determines that the operation number is greater than the predetermined critical operation number and controls the toaster to perform the step S4. Therefore, the heater OFF time $T_c$ and the heater ON time $T_h$ are kept unchanged.

In this way, after the critical number of toaster operation, the heater OFF time and the heater ON time are maintained at the critical heater OFF time and the critical heater ON time, respectively. Accordingly, even when many slices of bread are continually toasted, it is possible to properly bake the slices of bread.

The critical operation number can be properly selected through an experiment based on, e.g., a heating capacity of the heater, an initial heater OFF time $T_c$, an initial heater ON time $T_h$, $\Delta c$ and $\Delta h$. For example, in case that the initial heater OFF time $T_c$, the initial heater ON time $T_h$, $\Delta c$ and $\Delta h$ are respectively set to 0 sec, 30 sec, 3 sec and 2 sec, the critical operation number can be experimentally set to 6. In this case, the critical heater OFF time and the critical heater ON time will be 15 sec and 20 sec, respectively.

Figure 10:
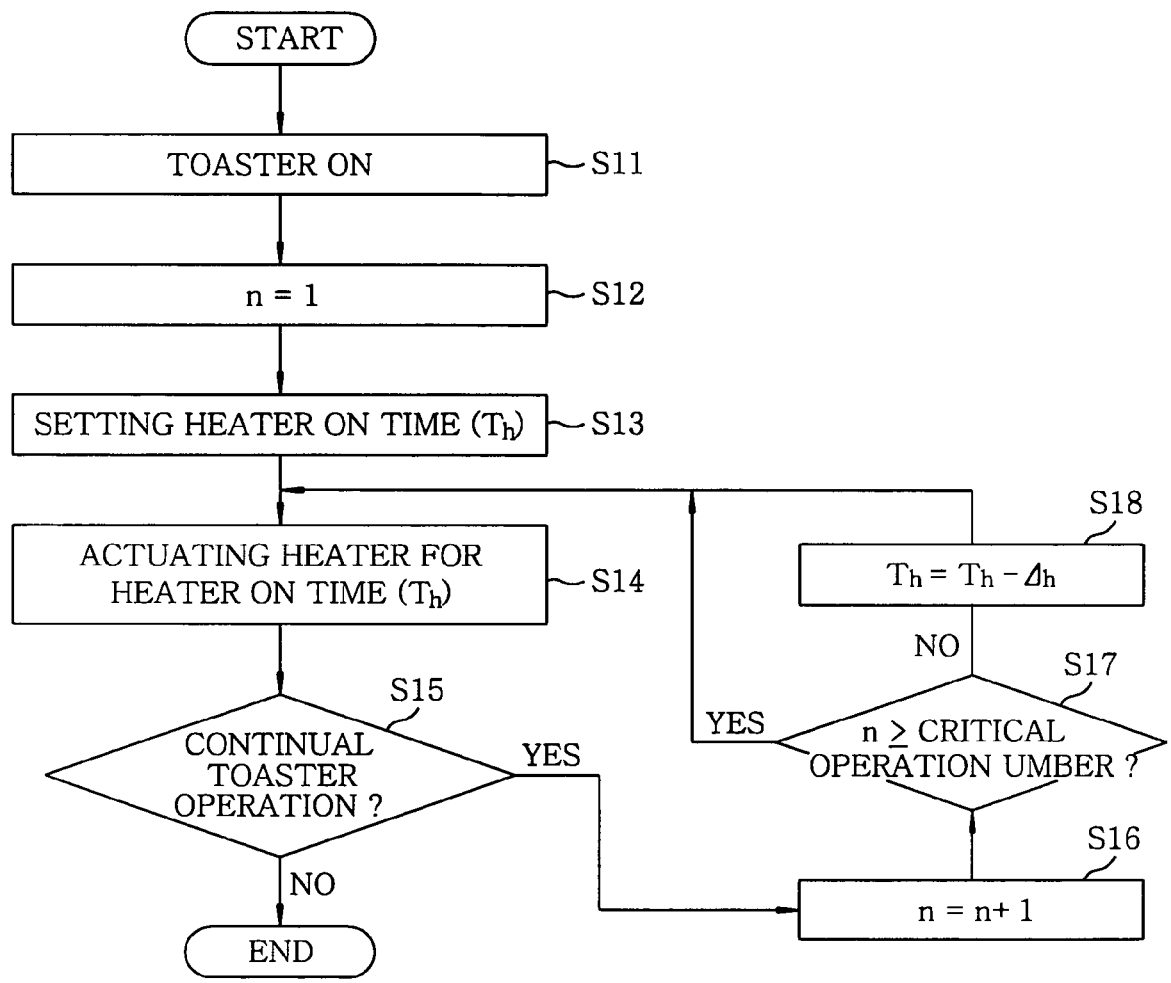
FIG. 10 is a flow chart of another process for controlling a heater of the toaster in accordance with the present invention.

In the above example, although the controller controls both of the heater OFF time and the heater ON time, the controller may control only the heater OFF time. A process wherein the controller controls only the heater ON time will now be described with reference to FIG. 10.

When the user pushes the toaster operation button provided on a control panel (S11), the toaster is operated. The controller sets the operation number n to 1 (n=1) (S12) and a heater ON time $T_h$ to, e.g., 30 sec (S13). The controller actuates the heater for the heater ON time $T_h$ (S14).

After the first toasting operation is completed, if the user pushes the continual operation button, the controller determines that this is a continual toaster operation (S15). Then, the controller sets the operation number n to n+1 and recognizes that this is the second operation (S16). At this time, the controller determines whether or not the operation number n is equal to or greater than a predetermined critical operation number (S17). If yes, the step S14 is again performed. In the step S17, it is determined that the operation number is less than the predetermined critical operation number, the controller sets the heater ON time $T_h$ to $T_h-\Delta h$ (for example, $\Delta h$ is 4 sec) (S18). Then, the step S14 is performed based on the heater ON time $T_h$ reset in the step S18. For example, when the critical operation number is 5, in the second operation, the steps S18 and S14 are performed so that the heater is actuated for 26 sec.

Thereafter, when the user pushes the continual operation button again, the controller determines that this is the third operation, and resets the heater ON time $T_h$ to $T_h-\Delta h$ at the step S18. Then, the step S14 is performed based on the heater ON time $T_h$ reset in the step S18. That is, the heater is actuated for 22 sec.

In this way, as the continual operation number of the toaster is increased, the heater ON time $T_h$ is gradually decreased.

However, after the operation number reaches the critical operation number, the heater ON time $T_h$ is kept unchanged. Specifically, when the user pushes the continual operation button for the fifth operation after the fourth toaster operation wherein the heater is energized for 14, the controller determines that the operation number is equal to the predetermined critical operation number and controls the toaster to perform the step S14. Therefore, the heater ON time $T_h$ is kept unchanged. (At this time, the heater ON time is referred to as a critical heater ON time.)

After the fifth toaster operation, when the user pushes the continual operation button for the sixth operation, the controller determines that the operation number is greater than the predetermined critical operation number and controls the toaster to perform the step S14. Therefore, the heater ON time $T_h$ is kept unchanged.

In this way, after the critical number of toaster operation, the heater ON time is maintained at the critical heater ON time. Accordingly, even when many slices of bread are continually toasted, it is possible to properly bake the breads.

The critical operation number can be properly selected through an experiment based on, e.g., a heating capacity of the heater, an initial heater ON time $T_h$ and $\Delta h$. For example, in case that the initial heater ON time $T_h$ and $\Delta h$ are respectively set to 30 sec and 5 sec, the critical operation number can be experimentally set to 4. In this case, the critical heater ON time will be 15 sec.

In the above examples, the increment of the heater OFF time $\Delta c$ and the decrement of the heater ON time $\Delta h$ are constant; however, it is appreciated that they may be varied as the continual toaster operation number is increased. For example, in the first example, $\Delta c$ may be 5, 6, 7... sec and $\Delta h$ may be 3, 4, 5... sec as the continual toaster operation number is increased.

Further, in the above examples, there has been described that the controller determines that the toaster is continually operated when a user pushes the continual operation button, but the present invention is not limited thereto. For example, the controller may determines that the toaster is continually operated when the toaster operation button is pushed within a predetermined time (e.g., 10 sec) after the operation of the heater has been stopped.

While the invention has been shown and described with respect to the preferred embodiments, it will be understood by those skilled in the art that various changes and modifications may be made without departing from the spirit and the scope of the invention as defined in the following claims.

What is claimed is:

1. A microwave oven with a toaster comprising:
   a toaster casing;
   a heating chamber inserted in the toaster casing;
   a bread receiver slidably inserted in the toaster casing, the bread receiver being selectively placed in the heating chamber;
   a toaster door attached to a front side of the bread receiver; and
   a crumb tray slidably inserted in the toaster casing, the crumb tray being placed under the bread receiver.

2. The microwave oven of claim 1, wherein the crumb tray is detachably attached to the toaster door so that the former is moved together with the latter.

3. The microwave oven of claim 1, wherein a bottom of the toaster casing has a stepped section with an upper portion and a lower portion, the bread receiver being slidably placed on the upper portion and the crumb tray being slidably placed on the lower portion.

4. The microwave oven of claim 1, wherein a pair of guide rails are provided on both side walls of the toaster casing, respectively, the bread receiver being slidably placed on the guide rails and the crumb tray being slidably placed on a bottom of the toaster casing.

5. The microwave oven of claim 1, wherein a heater plate is installed on each side wall of the heating chamber, the heater plate being held by supporting members provided to the side wall of the heating chamber, the supporting members being bendable onto the heater plate.

6. The microwave oven of claim 5, wherein the supporting members are provided on a bottom edge of the heating chamber and each of the supporting members includes a supporting portion for supporting a bottom of the heater plate and a bendable portion to be bended onto the heater plate.

7. The microwave oven of claim 1, wherein a plurality of embossed portions are provided on side walls of the heating chamber.

8. A microwave oven with a toaster comprising:
   a toaster casing;
   a heating chamber inserted in the toaster casing;
   a bread receiver slidably inserted in the toaster casing, the bread receiver being selectively placed in the heating chamber;
   a toaster door attached to a front side of the bread receiver; and
   a holding unit for holding bread put in the bread receiver, wherein the holding unit includes:
   a pair of holding members each of which has at least two first rods substantially horizontally extending spaced apart from each other and a plurality of second rods substantially vertically extending to connect the first rods together, wherein the lowermost first rod is fitted in a corresponding recess formed in an inner surface of the toaster door and the innermost second rod is extended through a corresponding hole formed in a bottom of the bread receiver; and
   an elastic member for narrowing a distance between upper portion of the holding members to hold the bread put in the bread receiver.

9. The microwave oven of claim 8, wherein the elastic member is a coiled spring ends of which are secured to the holding members, respectively.

10. The microwave oven of claim 8, wherein the holding unit further includes a mechanism for widening the upper portion of the holding members against force of the elastic member when the bread receiver is drawn out from the toaster casing.

11. The microwave oven of claim 10, wherein the mechanism for widening the upper portion of the holding members includes protrusions provided on both side walls of the toaster casing, and wherein, when the bread receiver is drawn out from the toaster casing, lower end portions of the innermost second rods extended through the respective holes in the bottom of the bread receiver contact with the corresponding protrusion to be pushed toward a longitudinal center line of the bread receiver against the force of the elastic member so that the distance between the upper portions of the holding members becomes wider and, when the bread receiver is put in the toaster casing, the lower end portions of the innermost second rods are released from the protrusion so that the distance between the upper portions of the holding members becomes narrower by the force of the elastic member.

* * * * *